US 9,501,396 B2

United States Patent
Chang et al.

(10) Patent No.: US 9,501,396 B2
(45) Date of Patent: Nov. 22, 2016

(54) WEAR LEVELING WITH MARCHING STRATEGY

(71) Applicant: MACRONIX INTERNATIONAL CO., LTD., Hsinchu (TW)

(72) Inventors: Hung-Sheng Chang, Taipei (TW); Cheng-Yuan Wang, Taipei (TW);
(Continued)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 305 days.

(21) Appl. No.: 13/969,462

(22) Filed: Aug. 16, 2013

(65) Prior Publication Data
US 2014/0189286 A1    Jul. 3, 2014

Related U.S. Application Data
(60) Provisional application No. 61/748,616, filed on Jan. 3, 2013.

(51) Int. Cl.
*G06F 12/10* (2016.01)
*G06F 12/02* (2006.01)

(52) U.S. Cl.
CPC ......... *G06F 12/0238* (2013.01); *G06F 12/109* (2013.01); *G06F 2212/1032* (2013.01);
(Continued)

(58) Field of Classification Search
CPC ............... G06F 12/0238; G06F 12/109; G06F 2212/1032; G06F 2212/7204; G06F 2212/7211
See application file for complete search history.

(56) References Cited

U.S. PATENT DOCUMENTS 6,000,006 A * 12/1999 Bruce ................. G06F 11/1068
                                                    711/103
7,599,139 B1 * 10/2009 Bombet ................... G11B 5/09
                                                    360/31
(Continued)

OTHER PUBLICATIONS

Chanik Park, Wonmoon Cheon, Jeonguk Kang, Kangho Roh, Wonhee Cho, and Jin-Soo Kim. 2008. A reconfigurable FTL (flash translation layer) architecture for NAND flash-based applications. ACM Trans. Embed. Comput. Syst. 7, 4, Article 38 (Aug. 2008), 23 pages.*

*Primary Examiner* — David X Yi
*Assistant Examiner* — Ramon A Mercado
(74) *Attorney, Agent, or Firm* — Haynes Beffel & Wolfeld LLP

(57) ABSTRACT

A method for managing utilization of a memory including a physical address space comprises mapping logical addresses of data objects to locations within the physical address space, and defining a plurality of address segments in the space as an active window. The method comprises allowing writes of data objects having logical addresses mapped to locations within the plurality of address segments in the active window. The method comprises, upon detection of a request to write a data object having a logical address mapped to a location outside the active window, updating the mapping so that the logical address maps to a selected location within the active window, and then allowing the write to the selected location. The method comprises maintaining access data indicating utilization of the plurality of address segments in the active window, and adding and removing address segments from the active window in response to the access data.

18 Claims, 13 Drawing Sheets

Swapping a Data Object Into the Active Window

Results of Swapping

(72) Inventors: Hsiang-Pang Li, Hsinchu (TW);
Yuan-Hao Chang, Taipei (TW);
Pi-Cheng Hsiu, Kaohsiung (TW);
Tei-Wei Kuo, New Taipei (TW)

(52) U.S. Cl.
CPC .................. *G06F 2212/7204* (2013.01); *G06F 2212/7211* (2013.01)

(56) References Cited

U.S. PATENT DOCUMENTS

| | | | | |
|---|---|---|---|---|
| 7,620,769 B2* | 11/2009 | Lee | ................... | G06F 12/1416 711/103 |
| 8,028,121 B2* | 9/2011 | Jeong | ................... | G06F 12/0246 365/185.33 |
| 8,656,083 B2* | 2/2014 | Kern | ................... | G06F 12/0246 365/185.33 |
| 8,819,380 B2* | 8/2014 | Patil | ................... | G06F 3/0674 711/165 |
| 2007/0067575 A1* | 3/2007 | Morris | ................... | G06F 12/121 711/133 |
| 2007/0150689 A1 | 6/2007 | Pandit et al. | | |
| 2007/0208904 A1* | 9/2007 | Hsieh | ................... | G06F 12/0246 711/103 |
| 2007/0294490 A1* | 12/2007 | Freitas et al. | ................... | 711/154 |
| 2008/0082735 A1* | 4/2008 | Shiga | ................... | G06F 13/28 711/103 |
| 2009/0089485 A1* | 4/2009 | Yeh | ................... | G06F 12/0246 711/103 |
| 2009/0254729 A1* | 10/2009 | Lin et al. | ................... | 711/170 |
| 2009/0276470 A1 | 11/2009 | Vijayarajan et al. | | |
| 2011/0055458 A1* | 3/2011 | Kuehne | ................... | 711/103 |
| 2011/0238892 A1* | 9/2011 | Tsai et al. | ................... | 711/103 |
| 2012/0297123 A1* | 11/2012 | Cherubini | ................... | G06F 12/0246 711/103 |
| 2013/0326148 A1* | 12/2013 | Fang | ................... | G06F 12/0246 711/133 |
| 2014/0122774 A1* | 5/2014 | Xian | ................... | G06F 12/0246 711/103 |
| 2014/0173177 A1* | 6/2014 | Benhase | ................... | G06F 12/0246 711/103 |

\* cited by examiner

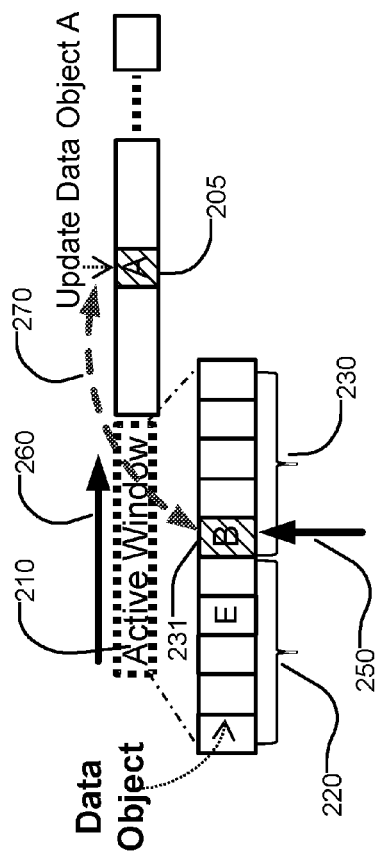
FIG. 2A Swapping a Data Object Into the Active Window
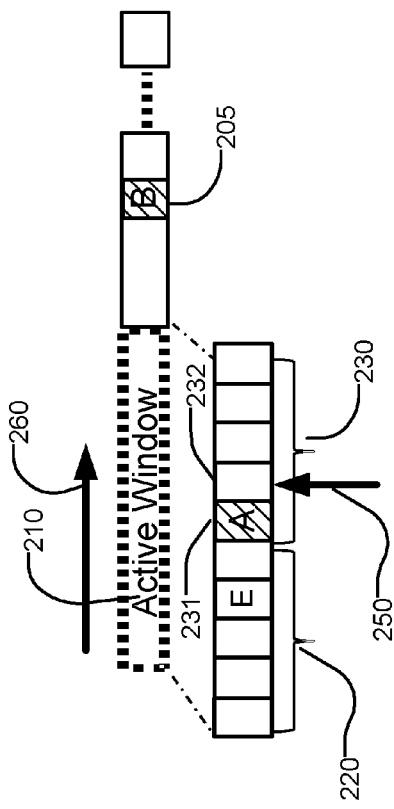
FIG. 2B Results of Swapping

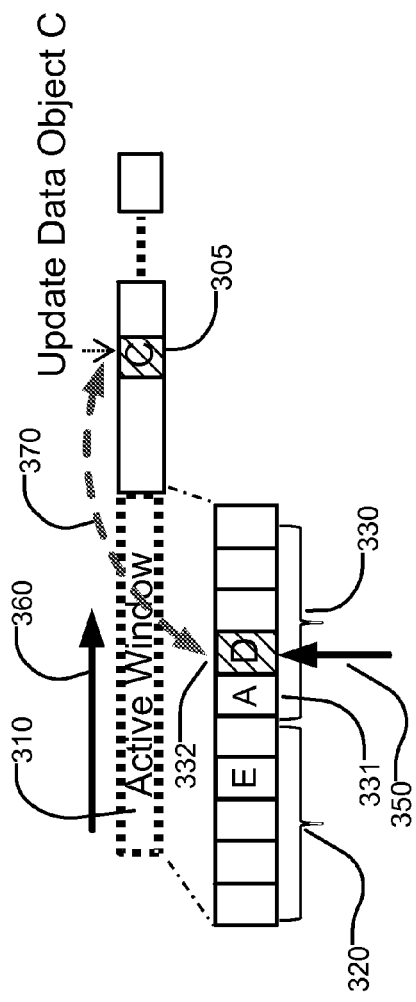
FIG. 3A Expanding the Active Window
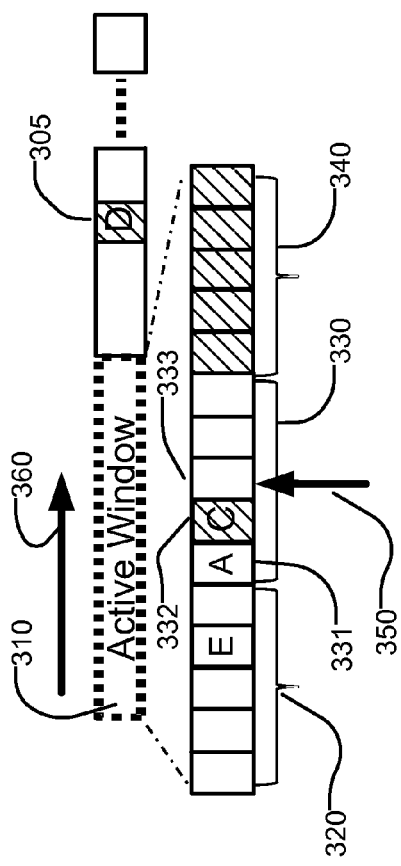
FIG. 3B Results of Expanding the Active Window

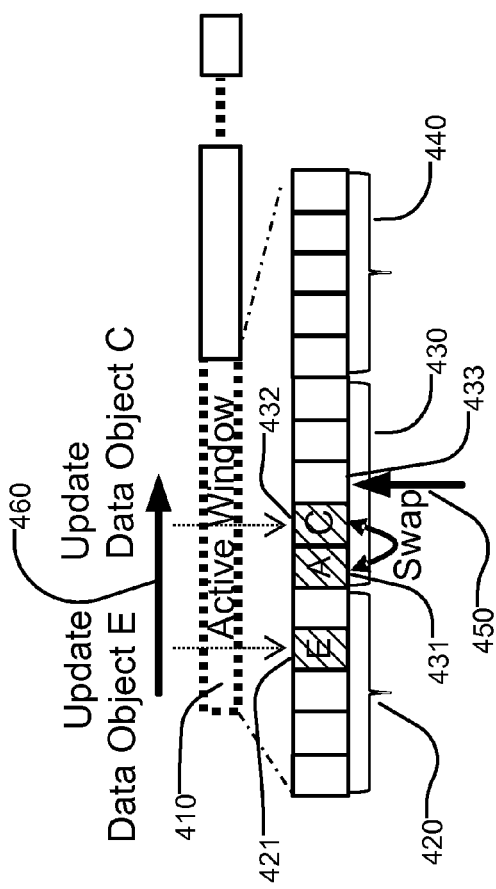
FIG. 4A Swapping Data Objects in an Address Segment
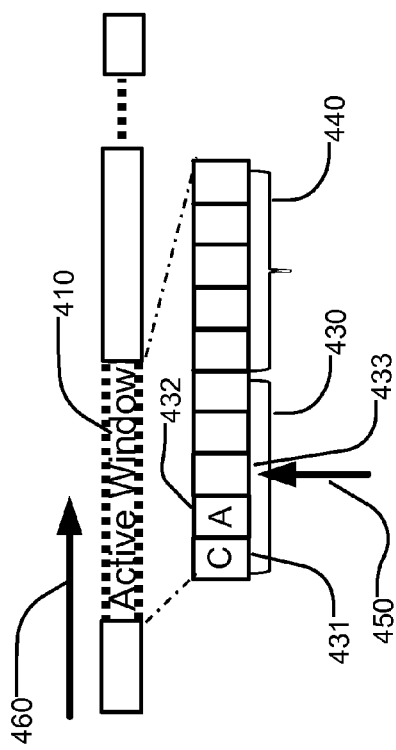
FIG. 4B Shrinking the Active Window

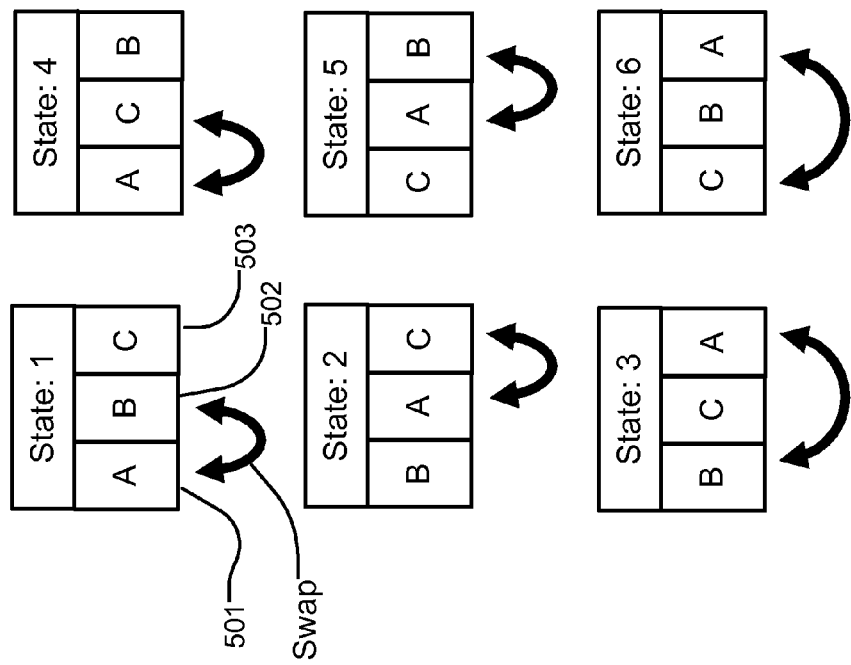
FIG. 5 Swapping Data Objects in an Address Segment

Updating Indirect Target Pointers

Swapping Inodes and Updating Indirect Source Pointers

WEAR LEVELING WITH MARCHING STRATEGY

RELATED APPLICATIONS

This application claims the benefit of U.S. Provisional Patent Application No. 61/748,616 filed on 3 Jan. 2013, which application is incorporated by reference as if fully set forth herein.

BACKGROUND OF THE INVENTION

1. Field of the Invention

The present invention relates to memory devices and systems including memory management.

2. Description of Related Art

Nonvolatile memory has write/erase endurance limitations. Without memory management with regard to write/erase endurance limitations, the memory may wear out prematurely or even cause system failure. Wear leveling for memory management is an approach to increase endurance of nonvolatile memory. Implementation of an effective wear leveling algorithm may consume memory space, increase operating complexity, and cause system overhead and latency. Therefore, it is important to balance the trade-offs between low latency and effective wear leveling. Write/erase endurance limitations for nonvolatile memory such as phase change material based memory can be about $10^6$-$10^9$, lower than those of dynamic random access memories (DRAM) which can be more than $10^{15}$. Consequently, it can be more important to have effective wear leveling algorithms for nonvolatile memory to be used in high endurance environments like those normally limited to DRAM. Particularly, metadata including inodes used in file systems to maintain attributes for files and directories is frequently updated so that metadata can experience the endurance problem of nonvolatile memory.

It is desirable to provide an effective wear leveling design that has low computational complexity and low latency, and that can be compatible with existing virtual addressing schemes used for memory management.

SUMMARY

Technology is described that supports storage of data objects that are updated relatively often, in non-volatile memory having limited endurance, such as phase change memory, or in other memory types in which data is moved by memory management processes that may be independent of the character of the data object.

A system using the technology can include logic for wear-leveling with a marching strategy. The marching strategy uses an active window for performing wear-leveling in a region defined by the active window, and for changing the active window by expanding or shrinking the active window. Wear-leveling in a region is achieved by swapping frequently updated data objects into the active window, swapping infrequently updated data objects out of the active window, and swapping data objects inside address segments in the active window. Also, the active window can be moved, or "marched", within the physical address space, according to a variety of window movement procedures, to distribute the utilization across the memory.

For example, a method for managing utilization of a memory including a physical address space is described that includes mapping logical addresses of data objects to locations within the physical address space, and defining a plurality of address segments in the physical address space as an active window. The method includes allowing writes of data objects having logical addresses mapped to locations within the plurality of address segments in the active window. The method includes, upon detection of a request to write a data object having a logical address mapped to a location outside the active window, updating the mapping so that the logical address maps to a selected location within the active window, and then allowing the write to the selected location. A described method includes a window movement procedure that includes maintaining access data indicating utilization of the plurality of address segments in the active window, and adding and removing address segments from the active window in response to the access data.

The method includes, when allowing the write to the selected location, moving a data object in the selected location to the location outside the active window and updating the mapping so that a logical address of the data object in the selected location is mapped to the location outside the window. The method includes identifying the selected location using a pointer, and incrementing the pointer to identify a next selected location to be used in case of another request to write to a location outside the active window.

In one example described herein, the access data includes a first window count ($cnt_p$) of accesses to the plurality of address segments in the active window. The method includes adding an address segment to the active window when the first window count ($cnt_p$) reaches a first threshold for the window and the logical address of the data object is mapped to a selected location outside the active window.

The access data can include a second window count ($cnt_t$) of accesses to the plurality of address segments in the active window, and a set of per-segment counts of accesses to corresponding address segments (states) in the active window. The method can include, upon detection of a request to write a data object having a logical address mapped to a location inside the active window, removing an address segment including the location inside the active window from the active window when the second window count ($cnt_t$) reaches a second threshold for the window and the per-segment count (state) for the address segment reaches a per-segment threshold for the address segment (i.e. final state).

The plurality of address segments includes respective sets of more than two containers for the data objects. The method includes, upon detection of a request to write a data object having a logical address mapped to a location inside the active window, swapping the data objects between two of the containers in the set of containers in a given address segment including the data object if the per-segment count of accesses (state) to the given address segment is below the per-segment threshold and the second window count ($cnt_t$) reaches the second threshold.

The step of maintaining access data includes incrementing the first window count ($cnt_p$) upon detection of a request to write a data object, and resetting the first window count ($cnt_p$) if the first window count ($cnt_p$) reaches the first threshold for the window. Likewise, the step of maintaining access data includes incrementing the second window count ($cnt_t$) upon detection of a request to write a data object, and resetting the second window count ($cnt_t$) if the second window count ($cnt_t$) reaches the second threshold for the window.

The address segment includes N containers where N is greater than 1, and the per-segment threshold for the address segment is N×(N−1). The step of swapping the data objects includes incrementing the per-segment count of accesses (state) to the given address segment.

A system using the technology can include logic for finding a particular object according to the mapping of the objects to addresses for corresponding containers and indirect pointers, and using the indirect pointer (e.g. target pointer) to access the particular object. The objects can be moved among the containers in the plurality of containers according to usage patterns in the memory (e.g. wear leveling) without changing the mapping.

For example, a method for memory management, is described that includes storing data objects in a plurality of containers having addresses and that comprise addressable units of a physical memory; using indirect pointers to access the data objects, the indirect pointer in a particular container pointing to the address of a container in the plurality of containers in which the corresponding data object is stored; and moving the data objects and updating the indirect pointers according to a wear leveling protocol for the physical memory. The indirect pointers can be stored in the same physical memory as the containers. Also, the indirect pointers can be stored in the containers.

In one example described herein, a method for memory management for a file system including a plurality of data objects comprises storing the data objects (e.g. inodes) in a plurality of containers that have addresses and include addressable units of a memory, mapping the objects (e.g. inodes) to addresses for corresponding containers in the plurality of containers, and storing indirect pointers (e.g. target pointers) in the containers. The indirect pointer in a particular container points to the address of a container in the plurality of containers in which the corresponding object is stored. The method includes storing source pointers in the containers. The source pointer in the particular container points to the address of the container in the plurality of containers to which the object stored in the particular container is mapped.

The method includes moving an object stored in a first one of the containers to a second one of the containers, and using the source pointer in the first one to find a third one to which the object is mapped. The method includes updating the indirect pointer in the third one to point to the second one, and updating the source pointer in the second one to point to the third one. The movement of the data object may be a product of wear leveling in the memory, or other memory management technique unrelated to the nature of the data object.

The method can include swapping a first data object stored in a first one of the containers with a second data object stored in a second one of the containers, where the first data object is mapped to a third one of the containers and the second data object is mapped to a fourth one of the containers. The swapping operation can correspond for example to a movement of one object from a physical location in the memory that has a higher access count, to a physical location that has a lower access count, and of the object stored in the lower access count location to the higher access count location, to improve wear leveling. The swapping method in this example includes using the source pointer in the first one to find the third one, and using the source pointer in the second one to find the fourth one. The method includes updating the indirect pointer in the third one to point to the container that is pointed to by the indirect pointer of the fourth one, and updating the indirect pointer in the fourth one to point to the container that was pointed to by the indirect pointer of the third one before the indirect pointer of the third one is updated. The method includes updating the source pointer in the second one to point to the third one, and updating the source pointer in the first one to point to the fourth one. In case indirect pointers and/or source pointers point to the containers that store the indirect pointers and/or source pointers, the third one of the containers and/or the fourth one of the containers can be the same as the first one of the containers and/or the second one of the containers.

The use of phase change memory for storage of data objects, like inodes, can be beneficial because of the high access speeds possible which enable real time reads and writes, along with the non-volatile nature of phase change memory, which may enable faster recovery from loss of power or other reset events. It is important for systems including memory management to complete atomic operations such as updating metadata of file systems including indirect pointers as described herein. Systems utilizing backup power (e.g. a supercapacitor) can help ensure that such atomic operations can complete and consequently the systems can recover from loss of power without loss of data including the indirect pointers.

Other aspects and advantages of the present invention can be seen on review of the drawings, the detailed description and the claims, which follow.

BRIEF DESCRIPTION OF THE DRAWINGS

FIGS. 2A and 2B illustrate updating a data object by swapping the data object into the active window.

FIGS. 3A and 3B illustrate adding an address segment to the active window.

FIGS. 4A and 4B illustrate swapping data objects between two containers in an address segment and removing another address segment from the active window.

FIG. 5 illustrates swapping of data objects between two containers in an address segment.

DETAILED DESCRIPTION

A detailed description of embodiments of wear leveling with marching strategy is provided with reference to the Figures.

Figure 1:
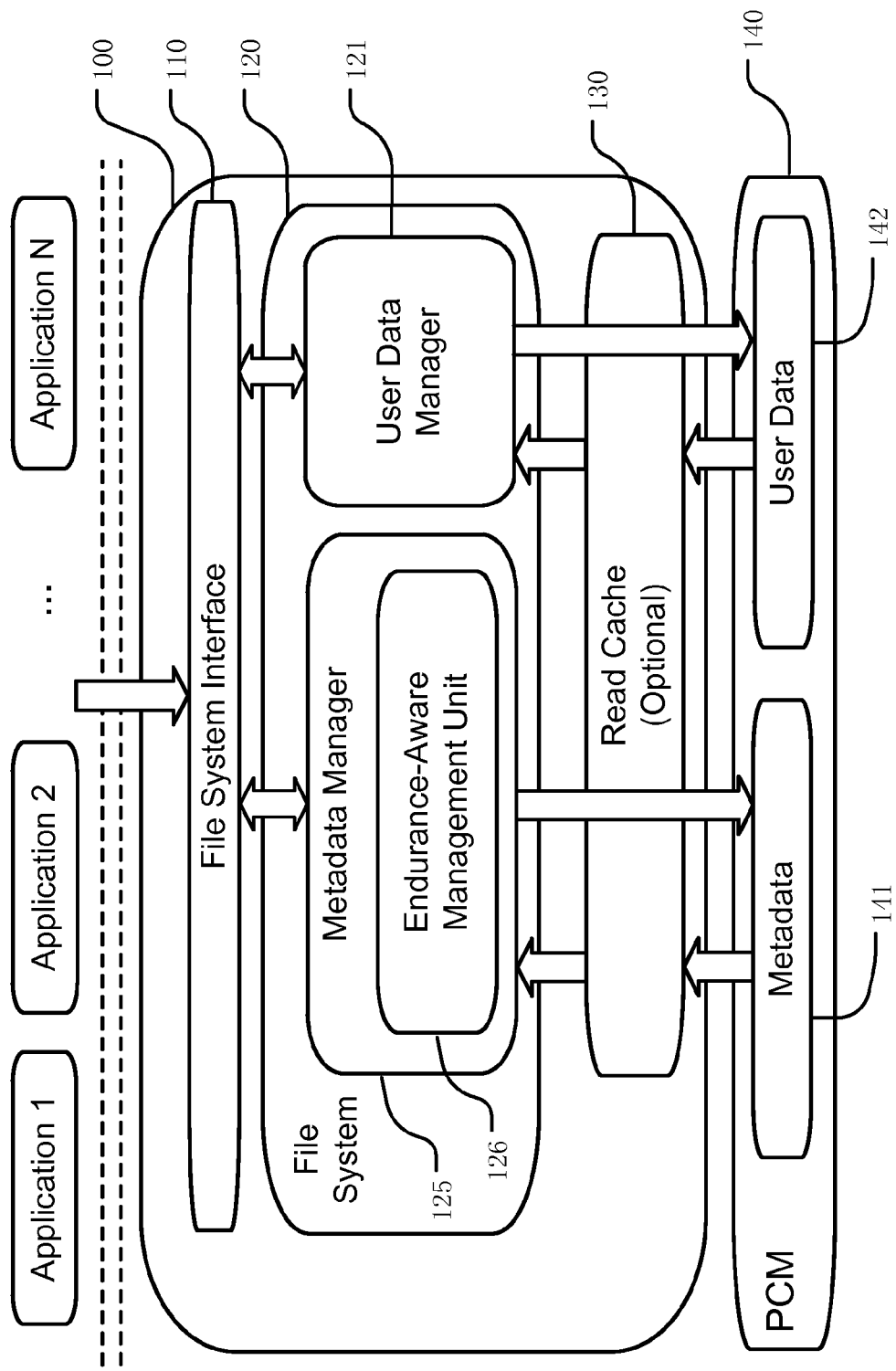
FIG. 1 is a block diagram of an example memory management system.

FIG. 1 is a block diagram of an example memory management system 100 using a method for managing utilization of a memory including a physical address space. The memory management system includes a file system interface 110 between user processes such as Application 1, Application 2, Application N and file system 120. File system 120 includes a user data manager 121 and a metadata manager 125. The file system 120 stores metadata 141 and user data 142 in phase change memory (PCM) 140. The physical address space can be in the phase change memory (PCM) 140, and metadata 141 can be in the physical address space. There can be a read cache 130 coupled between the file system 120 and the phase change memory 140.

When the file system interface 110 receives an input/output (I/O) request from a user process, it dispatches the request to the user data manager 121 in the file system 120 if the request is to access user data. Likewise, the file system interface 110 dispatches the request to the metadata manager 125 in the file system 120 if the request is to access metadata. The metadata manager 125 processes metadata, and includes an endurance-aware management unit 126 to prevent frequently updated metadata from wearing out PCM memory cells.

Metadata in a file system can include data objects such as inodes (i.e. index nodes) that provide information about attributes of data objects such as files and directories. A file or a directory can be represented by an inode. For instance, an inode can include such information as time and date when a file is created or modified, the author that creates the file, location where the file is created, size of the file, etc, but does not include the user data in the file. Thus size of an inode can be relatively small, for example, such as 128 bytes or 256 bytes. Modes are linked to memory locations that actually contain the user data.

FIGS. 2A and 2B illustrate updating a data object by swapping the data object into the active window. Logical addresses of data objects are mapped to locations within a physical address space. A plurality of address segments are defined in the physical address space as an active window. The active window can be moved, or "marched", within the physical address space, according to a variety of window movement procedures, to distribute the utilization across the memory. Data objects having logical addresses mapped to locations within the plurality of address segments in the active window can be written to the locations. Address segments in the plurality of address segments include containers, and the locations within the plurality of address segments can be locations of the containers.

Upon detection of a request to write a data object having a logical address mapped to a location outside the active window, mapping between the logical address and the location outside the active window is updated so that the logical address maps to a selected location within the active window, and then the data object is written to the selected location within the active window. A data object that was in the selected location within the active window can be moved to the location outside the active window, and mapping can be updated so that a logical address of the data object that was in the selected location within the active window is mapped to the location outside the active window. The selected location within the active window is identified using a location pointer. The location pointer points to a location in which a less frequently updated data object will be swapped out or written to a location outside the active window. After the data object is swapped out, the location pointer is incremented to identify a next selected location to be used in case of another request to write to a location outside the active window.

As illustrated in the example of FIG. 2A, the active window 210 includes a first address segment 220 and a second address segment 230. The first address segment 220 includes a container storing data object E, while the second address segment 230 includes a container 231 storing data object B. The number of containers in an address segment can be decided by a file system (e.g. 120, FIG. 1) to suit particular data patterns. Although only 5 containers are illustrated for each of the first address segment 220 and the second address segment 230, an address segment can include other number of containers, such as 10 or 15 containers. Data object A is stored in a container 205 outside the active window 210 and will be swapped into the active window 210. A location pointer 250 identifies the container 231 storing data object B which will be swapped out of the active window 210. The solid arrow 260 indicates the direction in which the active window 210 marches by adding and removing address segments. In one embodiment, the active window 210 marches forward in the direction of increasing physical addresses. For instance, the active window 210 can start marching at the lowest physical address or any physical address. The dotted arrow 270 indicates which data objects are going to be swapped (e.g. A and B).

As illustrated in the example of FIG. 2B, two data objects (e.g. A and B) are swapped such that the container 231 in the second address segment 230 now stores data object A, while the container 205 outside the active window 210 now stores data object B. Thus data object A is collected into the active window for regional distribution as described in connection with FIGS. 4A and 5. The location pointer 250 is incremented to identify container 232 in the address segment 230 as the next selected location of container in the active window.

FIGS. 3A and 3B illustrate adding an address segment to the active window. Access data is maintained to indicate utilization of the plurality of address segments in the active window. Address segments can be added to or removed from the active window. The access data can include a first window count of accesses to the plurality of address segments in the active window. The first window count is used to set a sampling period for adding an address segment to the active window. In one embodiment, the first window count of accesses includes a count of writes to the plurality of address segments in the active window.

Upon detection of a request to write a data object having a logical address mapped to a location outside the active window, a container storing the data object is identified. If the first window count has reached a first threshold, an address segment is first found from the physical address space outside the active window, and then added to the active window. In addition, the container storing the data object at the location outside the active window is swapped with a container at a selected location within the active window as identified by a location pointer, and the location pointer is subsequently incremented to identify a next selected location to be used in case of another request to write to a location outside the active window, as described in connection with FIGS. 2A-2B.

As illustrated in the example of FIG. 3A, the active window 310 includes a first address segment 320 and a second address segment 330. The first address segment 320 includes a container storing data object E, while the second address segment 330 includes a container 331 storing data object A and a container 332 storing data object D. Data object C is stored in a container 305 outside the active window 310 and will be swapped into the active window 310. A location pointer 350 identifies the container 332 storing data object B which will be swapped out of the active window 310. The solid arrow 360 indicates the direction in which the active window 310 marches by adding and removing address segments. The dotted arrow 370 indicates which data objects are going to be swapped (e.g. D and C).

As illustrated in the example of FIG. 3B, an address segment 340 is first found from the physical address space outside the active window 310, and then added to the active window 310. In addition, two data objects (e.g. D and C) are swapped such that the container 332 in the second address segment 330 now stores data object C, while the container 305 outside the active window 310 now stores data object D. The location pointer 350 is incremented to identify container 333 in the address segment 330 as the next selected location of container in the active window.

FIGS. 4A and 4B illustrate swapping data objects between two containers in an address segment and removing another address segment from the active window. The access data can include a second window count of accesses to the plurality of address segments in the active window. The second window count is used to set a sampling period for removing an address segment from the active window. In one embodiment, the second window count of accesses includes a count of writes to the plurality of address segments in the active window.

Upon detection of a request to write a data object having a logical address mapped to a location inside the active window, a container storing the data object is identified. If the second window count has reached a second threshold, an address segment for the container storing the data object is identified. An address segment can include more than two containers for data objects. Data objects between two of the containers in an address segment including the data object can be swapped. A per-segment count of accesses to a given address segment is incremented each time data objects between two containers are swapped. The per-segment count of accesses can reach a per-segment threshold of N×(N−1), where N is the number of containers in an address segment. If the per-segment count of accesses for the given address segment has not reached the per-segment count, data objects between two containers within the given address segment are swapped and the per-segment count for the given address segment is incremented. Otherwise, if the per-segment count of accesses for the given address segment has reached the per-segment count, the given address segment is removed from the active window.

As illustrated in the example of FIG. 4A, the active window 410 includes a first address segment 420, a second address segment 430, and a third address segment 440. The first address segment 420 includes a container 421 storing data object E, while the second address segment 430 includes a container 431 storing data object A and a container 432 storing data object C. A location pointer 450 identifies a container 433 storing a data object which can be swapped out of the active window 410 in an operation to swap a data object into the active window, such as described in connection with FIGS. 2A and 2B. The solid arrow 460 indicates the direction in which the active window 410 marches by adding and removing address segments.

If upon detection of a request to write data object E, the second window count has not reached the second threshold and the container 421 storing the data object E is within the active window 410, the data object E is updated directly, without swapping an data object out of the active window 410 and without swapping two data objects in the first address segment 420 which stores the data object E, as illustrated in FIG. 4A.

As illustrated in the example of FIG. 4B, two data objects (e.g. A and C) are swapped such that the container 431 in the second address segment 430 now stores data object C, while the container 432 in the second address segment 430 now stores data object A. The location pointer 450 remains at container 433 in the address segment 430 as container 433 is still the next selected location of container in the active window. Swapping of two data objects within an address segment is used to distribute writes regionally for wear leveling, and is further described in connection with FIG. 5.

If the second window count has reached the second threshold, the container 420 storing the data object E is within the active window 410, and the per-segment count of accesses for the first address segment 420 has reached the per-segment count, then the first address segment 420 is removed from the active window 410, as also illustrated in the example of FIG. 4B. Overtime, the active window may contain non-continuous address segments as a result of removing address segments from the active window.

FIG. 5 illustrates swapping of data objects between two containers in an address segment. Upon detection of a request to write a data object having a logical address mapped to a location inside the active window, a container storing the data object is identified. If the second window count reaches the second threshold, and the container storing the data object is within the active window, then an address segment for the container storing the data object is identified. If a per-segment count of accesses (a.k.a. state) to the address segment is below a per-segment threshold (a.k.a. final state), then data objects are swapped between two containers in the address segment, and the per-segment count of accesses (a.k.a. state) is incremented by one (1).

For an address segment with N containers, the per-segment threshold (a.k.a. final state) is N×(N−1). As illustrated in the example of FIG. 5, an address segment includes 3 containers (e.g. 501, 502, 503) so the per-segment threshold (a.k.a. final state) is 3×(3−1)=6. At each state, two different containers are chosen for swapping in a circular pattern. For instance, at State=1, data objects A and B stored in two containers (e.g. 501 and 502) are swapped. At State=2, data objects A and C stored in two containers (e.g. 502 and 503) are swapped. At State=3, data objects B and A stored in two containers (e.g. 501 and 503) are swapped. At State=4-6, pairs of containers are chosen in a similar pattern.

Thus, when the per-segment count of accesses (a.k.a. state) to the address segment reaches the per-segment threshold (a.k.a. final state), each data object (e.g. A, B, or C) has a similar probability of staying in any container within the address segment. Since at most only two data objects can be swapped in an address segment each time the second window count reaches the second threshold, the technology described herein provides a wear leveling design that has low computational complexity and low latency.

In one embodiment, a Marching Algorithm describes a method for managing utilization of a memory including a physical address space. The Marching Algorithm updates a data object using the marching strategy as described herein. Pseudocode for Marching Algorithm is reproduced below. The pseudocode uses inode i as an example for a data object, a global count cntp for a first window count, and another global count cntt for a second window count. The first window count is associated with a first threshold Tp, and the second window count is associated with a second threshold Tt. The pseudocode uses an active window W that defines a plurality of address segments in the physical address space. Address segments include respective sets of more than two containers for the data objects. A location pointer p to point to a selected location of a container within an address segment w within the active window W.

| Marching Algorithm |
|---|
| // upon detection of a request to update/write a data object (e.g. inode i) |
| 1      cntp++;    // increment |
| 2      cntt++;    // increment |
| 3      x = the container storing inode i; |
| // Expand the active window W |
| 4      if cntp == Tp then {    // first window count reaches first threshold |
| 5          cntp = 0 ;    // reset |
| 6          if x $\notin$ W then {    // data object not within the active window W |
| 7              w = an address segment found outside the active window W; |
| 8              EXPAND-WINDOW(W, w) ;// Expand W with w |
|             } |
|       } |
| // Shift an address segment w or shrink the active window W |
| 9      if cntt == Tt then {    // second window count reaches second threshold |
| 10     cntt = 0 ; // reset |
| 11     if x W then { |
| 12         w = the residing sub-window of container x; |
| 13         if IS-FINAL-STATE(w) == FALSE then |
| 14            SHIFT-SUB-WINDOW(w) ;// swap data objects within w |
| 15         else |
| 16            SHRINK-WINDOW(W, w) ;// remove w from W |
|       } |
|       } |
| // Swap inode i into W |
| 17     if x $\notin$ W then { |
| 18         SWAP-INODE (x, p) ; |
| 19         Let p point to the next container in W; |
|       } |
| 20     x = the container storing inode i; |
| 21     x.inode = i;// Update inode i stored in container x; |

Upon detection of a request to update a data object, such as an inode logic in accordance with Marching Algorithm can be invoked. On line 1 of Marching Algorithm, the first window count cntp is incremented (++). On line 2, the second window count cntt is incremented. On line 3, a selected location of a container x storing the inode i is identified. Depending on whether the selected location is within the active window W, the rest of Marching Algorithm can make different decisions on how to update the inode i.

On line 4, it is determined whether the first window count cntp has reached the first threshold Tp. If so, the first window count cntp is reset to a value such as 0 (line 5), and if the selected location is not within ($\notin$) the active window W (line 6), an address segment is first found from the physical address space outside the active window (line 7) and then added to the active window (line 8). The address segment can be found using algorithms for memory management such as the next-fit algorithm, the first-fit algorithm, the best-fit algorithm, or the worst-fit algorithm.

After the operation to add an address segment to the active window, if necessary, is performed, it is determined whether the second window count cntt has reached the second threshold Tt (line 9). If so, the second window count cntt is reset to a value such as 0 (line 10), and then it is further determined whether the selected location is within ($\in$) the active window W (line 11). If so, an address segment w for the selected location of a container storing the data object such as inode i is identified (line 12).

As described herein, data objects between two containers within a given address segment can be swapped for purposes of wear leveling. Each time data objects between two containers are swapped, a per-segment count of accesses to the given address segment is incremented. The per-segment count of accesses can reach a per-segment threshold of N×(N−1), where N is the number of containers in the address segment.

If the per-segment count of accesses for the given address segment w has not reached the per-segment count (line 13), data objects between two containers within the given address segment w are swapped and the per-segment count for the given address segment w is incremented (line 14). Using the per-segment count, the function Is-Final-State (w) decides between which two containers in the given address segment w to swap data objects, swaps data objects stored in the two containers, and increments the per-segment count for the given address segment (line 13).

If the per-segment count of accesses for the given address segment w has reached the per-segment count (line 15), the given address segment w is removed from the active window W, as indicated by the SHRINK-WINDOW (W, w) function (line 16).

On line 17, after the operation to add an address segment to the active window, to remove an address segment from the active window, or to swap two data objects within a given address segment, if any, has been performed, it is determined whether the container x storing the inode i is not within ($\notin$) the active window W (line 17). If not, the container at the selected location within the active window as identified by a location pointer p and the container x storing inode i are swapped, as indicated by the SWAP-INODE (x, p) function (line 18), and the location pointer p is subsequently incremented to identify a next selected location of container in the active window W (line 19). Then, the inode stored in container x is updated (lines 20-21).

Figure 6:
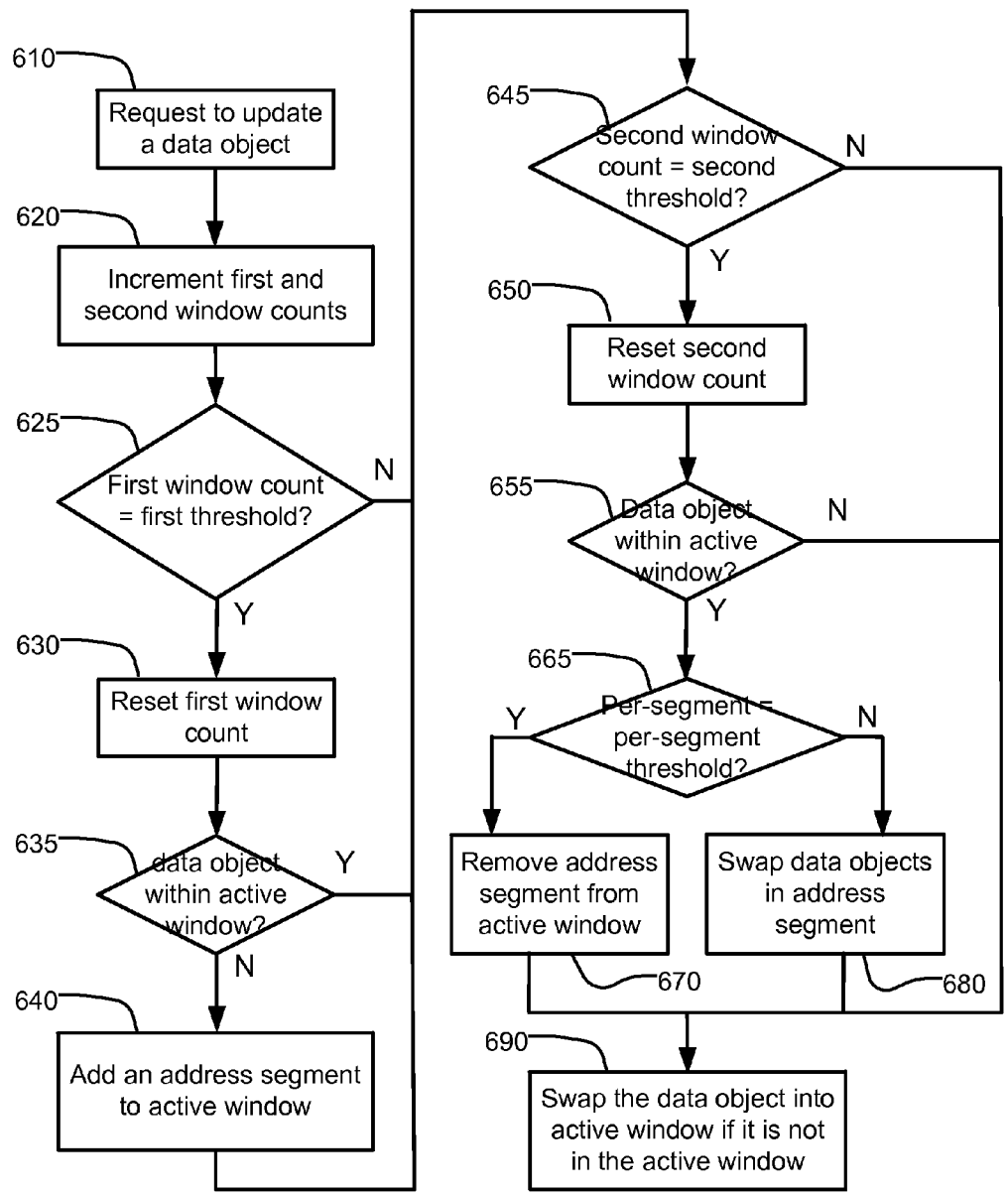
FIG. 6 is a flow chart for memory management using marching strategy.

FIG. 6 is a flow chart for memory management using the marching strategy. At Step 610, a request is detected to update a data object having a logical address mapped to a location outside the active window. At Step 620, the first window count and the second window count are incremented. At Step 625, it is determined whether the first window count has reached the first threshold for the window. If so, at Step 630, the first window count is reset to an initial value such as 0. At Step 635, it is determined whether the logical address of the data object is mapped to a selected location within the active window. If not, at Step 640, an address segment is first found from the physical address space and then added to the active window.

At Step 645, it is determined whether the second window count has reached a second threshold for the window. If so, at Step 650, the second window count is reset to an initial value such as 0. At Step 655, it is determined whether the logical address of the data object is mapped to a selected location within the active window. If yes, at Step 665, an address segment to which the logical address of the data object is mapped is first found, and it is further determined whether the per-segment count for the address segment has reached the per-segment threshold for the address segment. If the per-segment count for the address segment has reached the per-segment threshold, then at Step 670, the address segment is removed from the active window. If the per-segment count for the address segment has not reached the per-segment threshold, then at Step 680, data objects between two of containers in the set of containers for the address segment are swapped, and the per-segment count of accesses to the address segment is incremented. In one embodiment, if an address segment includes N containers, then the per-segment threshold for the address segment is N×(N−1).

At Step 690, after the operation to add an address segment to the active window, to remove an address segment from the active window, or to swap two data objects within an address segment, if any, has been performed, it is determined whether the logical address of the data object is mapped to a selected location within the active window. If not, the selected location within the active window is first identified using a pointer. The data object to be updated is written to the selected location, a data object previously in the selected location is moved to the location outside the active window, and the mapping is updated so that a logical address of the data object in the selected location is mapped to the location outside the window. The pointer is subsequently incremented to identify a next selected location to be used in case of another request to write to a location outside the active window.

FIGS. 7A-12 illustrate one embodiment of a swapping process corresponding to the SWAP-INODE function on line 18 of the Marching Algorithm and Step 690 in the flow chart in FIG. 6.

Figure 7B:
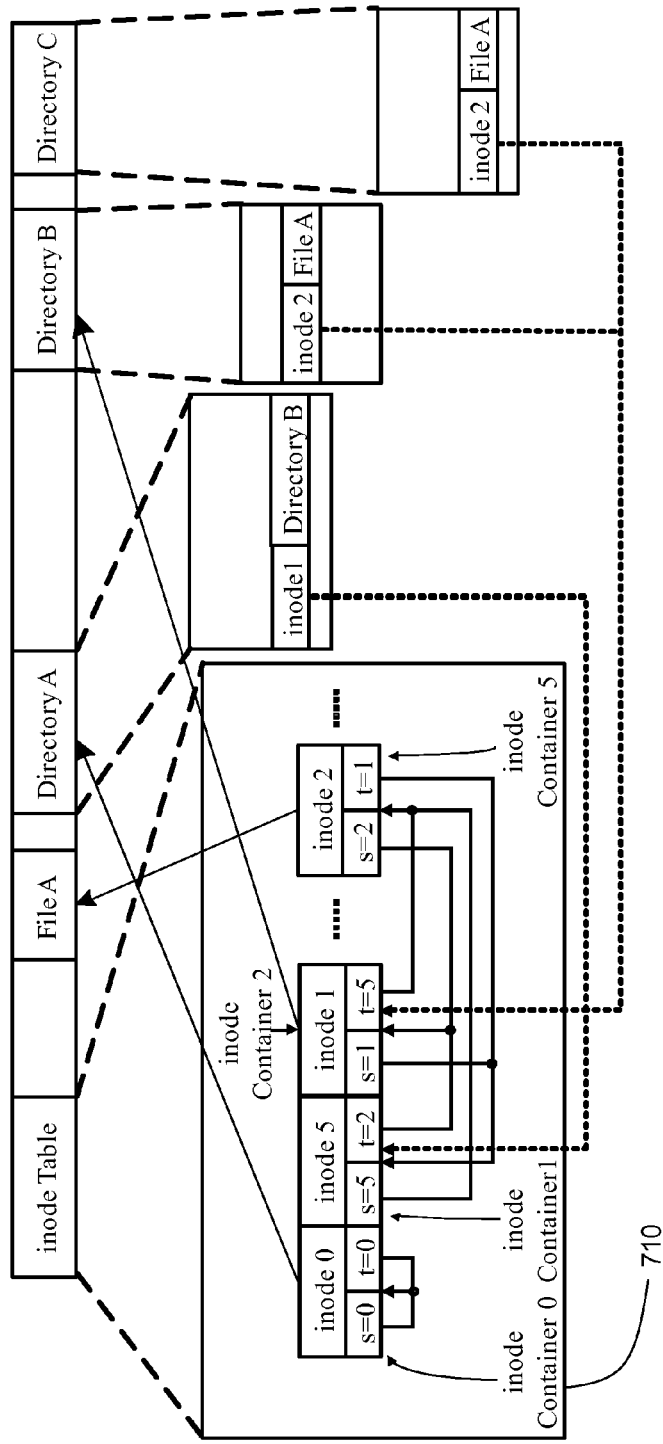
FIG. 7B illustrates example relationship between inodes stored in inode containers and respective files and directories represented by inodes.
Figure 7A:
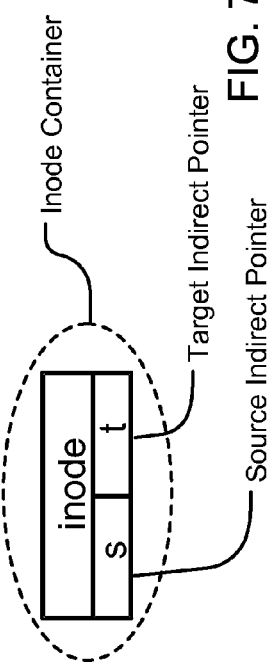
FIG. 7A illustrates an inode container.

FIG. 7A illustrates an inode container that stores an inode, an indirect target pointer t, and an indirect source pointer t. An inode container can be referred to as a container. An indirect target pointer can be referred to as an indirect pointer. An indirect source pointer can be referred to as a source pointer.

FIG. 7B illustrates relationship between inodes (i.e. index nodes) stored in inode containers and respective files and directories represented by inodes. For example, inodes 0, 1, and 2 provide information about attributes of Directory A, Directory B, and File A, respectively. To access the user data in a file (e.g. File A), the file system (e.g. 120, FIG. 1) needs to access the inode corresponding to the file (e.g. inode 2).

Data objects (e.g. inodes 0, 1, 2, 5) are stored in a plurality of containers (i.e. inode containers 0, 1, 2, 5) in an inode area 710. The containers have addresses and include addressable units of a memory. The inode area 710 can be in a PCM memory. Data objects (e.g. inodes 0, 1, 2, 5) in the containers (e.g. inode containers 0, 1, 2, 5) are mapped to addresses for corresponding containers in the plurality of containers. For instance, inodes 0, 1, 2, 5 are mapped to inode containers 0, 1, 2, 5, respectively, before any inodes are moved among the inode containers in the plurality of containers, for example according to usage patterns in the memory for purposes of memory management such as wear leveling.

Indirect target points (e.g. t=0, t=2, t=5, t=1) are stored in the inode containers (e.g. inode containers 0, 1, 2, 5). An indirect target pointer t in a particular container points to the address of a container in the plurality of containers in which the corresponding object is stored. For example, the indirect target pointer t in a particular inode container 2 points to the address of inode container 5 in which the inode corresponding to inode container 2 is stored. For example, the indirect target pointer t in the particular inode container 1 points to the address of inode container 2 in which the inode corresponding to inode container 1 is stored.

Indirect source points (e.g. s=0, s=5, s=1, s=2) are stored in the inode containers (e.g. inode containers 0, 1, 2, 5). An indirect source pointer s in a particular container points to the address of a container in the plurality of containers to which the object stored in the particular container is mapped. For example, the indirect source pointer s in the particular inode container 2 points to the address of inode container 1 to which the inode 1 stored in the particular inode container 2 is mapped. For example, the indirect source pointer s in the particular inode container 1 points to the address of inode container 5 to which the inode 5 stored in the particular inode container 1 is mapped.

A particular data object can be found by accessing the corresponding container according to the mapping of the objects to addresses for corresponding containers, and reading the indirect target pointer to access the particular object. For example, a particular data object inode 2 can be found by accessing the corresponding container (e.g. inode container 2) according to the mapping, and reading the indirect target pointer (e.g. t=5) to access the particular object inode 2 stored in inode container 5. For example, a particular data object inode 5 can be found by accessing the corresponding container (e.g. inode container 5) according to the mapping, and reading the indirect target pointer (e.g. t=1) to access the particular object inode 5 stored in inode container 1.

Thus, the file system (e.g. 120, FIG. 1) can access any particular inode by looking up only one indirect target pointer in an inode container corresponding to the particular inode, regardless of how many data objects are stored in the file system, or how many times the particular inode is moved among the inode containers in the plurality of containers.

Data objects (e.g. inodes) can be moved among the containers in the plurality of containers according to usage patterns in the memory (e.g. wear leveling) without changing the mapping of the data objects (e.g. inodes) to addresses for corresponding containers. As illustrated in FIG. 7B, although inodes have been moved among the containers such that inode 5 is not stored in inode container 5 but in inode container 1, and inode 1 is not stored in inode container 1 but in inode container 2, the file system can still access any particular inode by looking up only one indirect target pointer.

Figure 8:
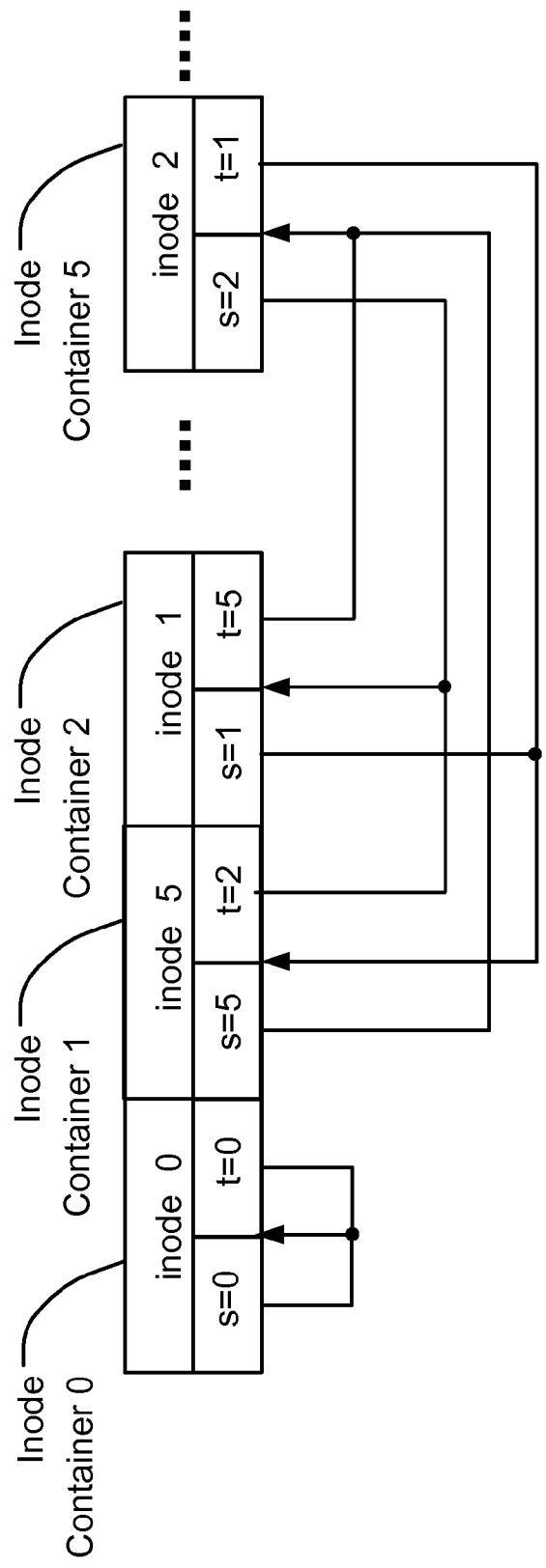
FIG. 8 illustrates example states of inodes before they are moved among inode containers.

FIG. 8 corresponds to the inode area 710 in FIG. 7B, and illustrates example states of inodes before they are moved or swapped among inode containers as explained in connection with FIG. 9 and FIG. 10. In particular, Inode container 0 stores a data object (e.g. inode 0), and a source pointer s and a target pointer t both pointing to the address of the inode container 0. Inode container 1 stores a data object (e.g. inode 5), a source pointer s pointing to the address of inode container 5 to which the object (e.g. inode 5) stored in the inode container 1 is mapped, and a target pointer t pointing to the address of inode container 2 in which the corresponding object (e.g. inode 1) is stored. Inode container 5 stores a data object (e.g. inode 2), a source pointer s pointing to the address of inode container 2 to which the object (e.g. inode 2) stored in the inode container 5 is mapped, and a target pointer t pointing to the address of inode container 1 in which the corresponding object (e.g. inode 5) is stored.

Objects (e.g. inodes) are moved or swapped among containers according to usage patterns in the memory (e.g. wear leveling). To ensure that after objects are moved or swapped, the file system (e.g. 120, FIG. 1) can find a particular object by accessing the corresponding container and reading the indirect target pointer to access the particular object, source pointers and target pointers in the inode containers are updated when inodes are moved or swapped.

Figure 9:
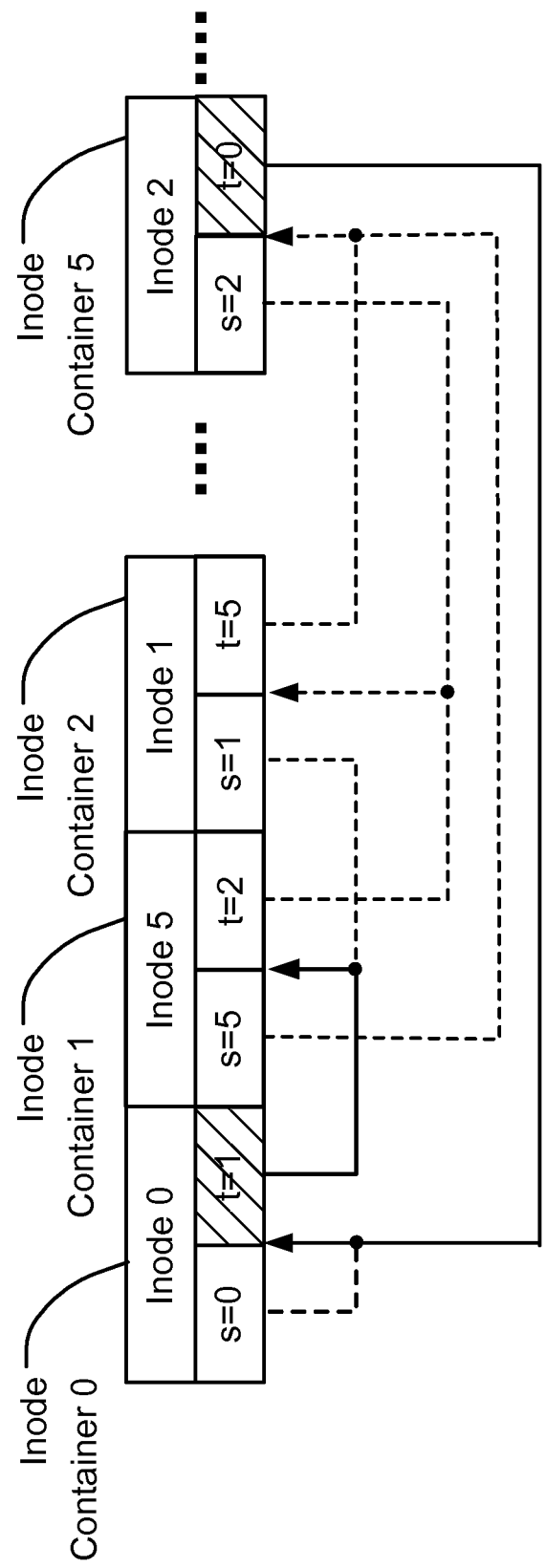
FIG. 9 illustrates updating indirect target pointers.

FIG. 9 illustrates updating indirect target pointers. A first data object (e.g. inode 5) stored in a first container (e.g. inode container 1) are to be swapped with a second data object (e.g. inode 0) stored in a second container (e.g. inode container 0). The first data object (e.g. inode 5) is mapped to a third container (e.g. inode container 5), and the second data object (e.g. inode 0) is mapped to a fourth container (e.g. inode container 0). In this example, the second container and the fourth container both refer to inode container 0, because the indirect source pointer s in inode container 0 points back to inode container 0. In general, the second container and the fourth container can refer to different containers. The indirect source pointer s in the first container (e.g. inode container 1) is used to find the third container (e.g. inode container 5). The indirect source pointer s in the second container to find the second or fourth container (e.g. inode container 0).

The indirect target pointer t in the third container (e.g. inode container 5) is updated to point to the container that is pointed to by the indirect target pointer t of the fourth container (e.g. inode container 0). The indirect target pointer t in the fourth container (e.g. inode container 0) is updated to point to the container that was pointed to by the indirect target pointer t of the third container before the indirect target pointer t of the third container is updated (e.g. inode container 1).

Figure 10:
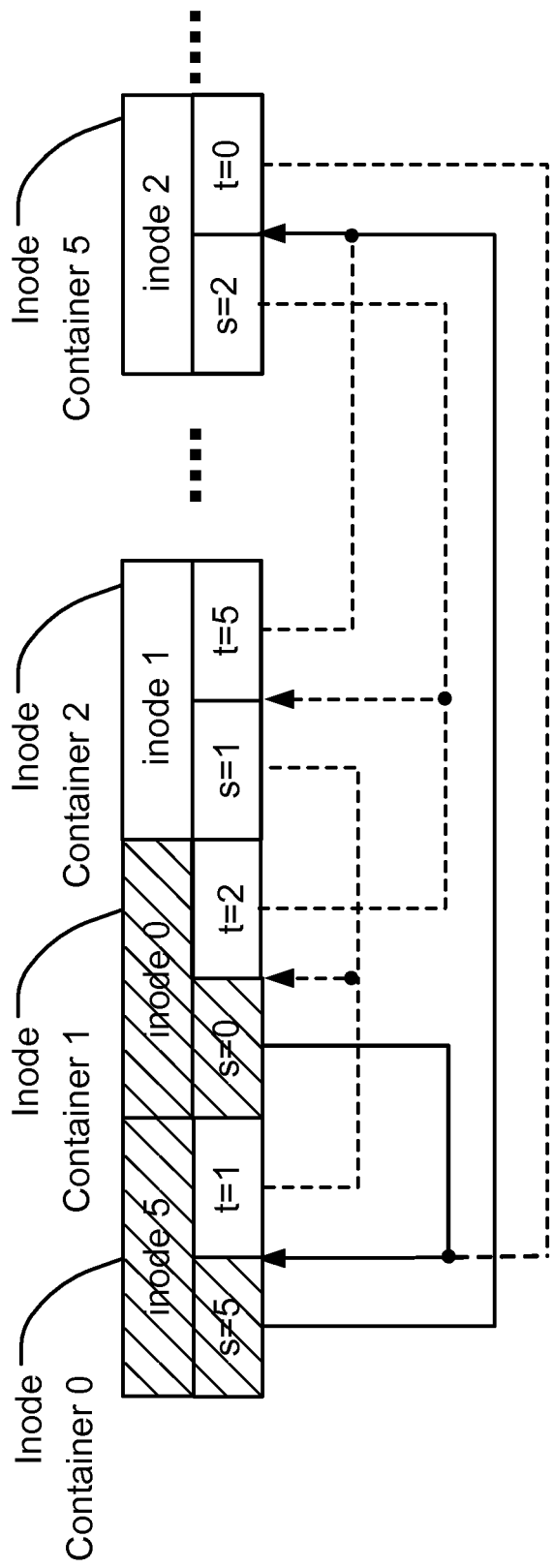
FIG. 10 illustrates swapping inodes and updating indirect source pointers.

FIG. 10 illustrates swapping inodes and updating indirect source pointers. A first data object (e.g. inode 5) stored in a first container (e.g. inode container 1) is swapped with a second data object (e.g. inode 0) stored in a second container (e.g. inode container 0). The indirect source pointer s in the second container (e.g. inode container 0) is updated to point to the third container (e.g. inode container 5), and the indirect source pointer s in the first container (e.g. inode container 1) is updated to point to the fourth container (e.g. inode container 0), which is also referred to as the second container in this example.

Swapping a first data object (e.g. inode 5) stored in a first container (e.g. inode container 1) with a second data object (e.g. inode 0) stored in a second container (e.g. inode container 0) results in having the first data object stored in the second container and the second data object stored in the first container. For instance, swapping can be done by moving the second data object stored in the second container to a temporary storage space, moving the first data object stored in the first container to the second container, and then moving the second data object from the temporary storage space to the first container.

As illustrated in FIGS. 8, 9 and 10, inodes 0 and 5 initially stored in inode containers 0 and 1 are swapped after the target pointers are updated. Alternatively, inodes 0 and 5 initially stored in inode containers 0 and 1 can be swapped before the target pointers are updated.

In one embodiment, Algorithm 1 describes a method for memory management for a file system including a plurality of data objects. Pseudocode for Algorithm 1 is reproduced below:

1: xstmp=x.s;
2: ystmp=y.s;
3: swap (xstmp.t, ystmp.t);
4: swap (x.s, y.s);
5: swap (x.inode, y.inode);

In Algorithm 1, x and y represent first and second inode containers in a plurality of inode containers, x.s and y.s represent indirect source pointers in the first and second inode containers x and y, and x.inode and y.inode represent inodes stored in the first and second inode containers x and y. Indirect source pointers x.s and y.s point to third and fourth inode containers xstemp and ystemp. Third and fourth inode containers xstemp and ystemp store indirect target pointers xstemp.t and ystemp.t. Function swap ( ) represents a function that swaps two arguments given to the function. For instance, the two arguments can be two indirect target pointers, two indirect source pointers, or two inodes.

On line 1 of Algorithm 1, a third inode container xstemp is found by using the indirect source pointer x.s in the first inode container x. On line 2, a fourth inode container ystmp is found by using the indirect source pointer y.s in the second inode container y.

On line 3, indirect target pointers xstmp.t and ystmp.t stored in the third and fourth inode containers are swapped. On line 4, indirect source pointers x.s and y.s stored in the first and second inode containers are swapped. On line 5, inodes stored in the first and second inode containers are swapped.

In alternative embodiments, the swapping of inodes on line 5 can be executed before the swapping of indirect source pointers on line 4, or before the swapping of indirect target pointers on line 3.

Figure 11:
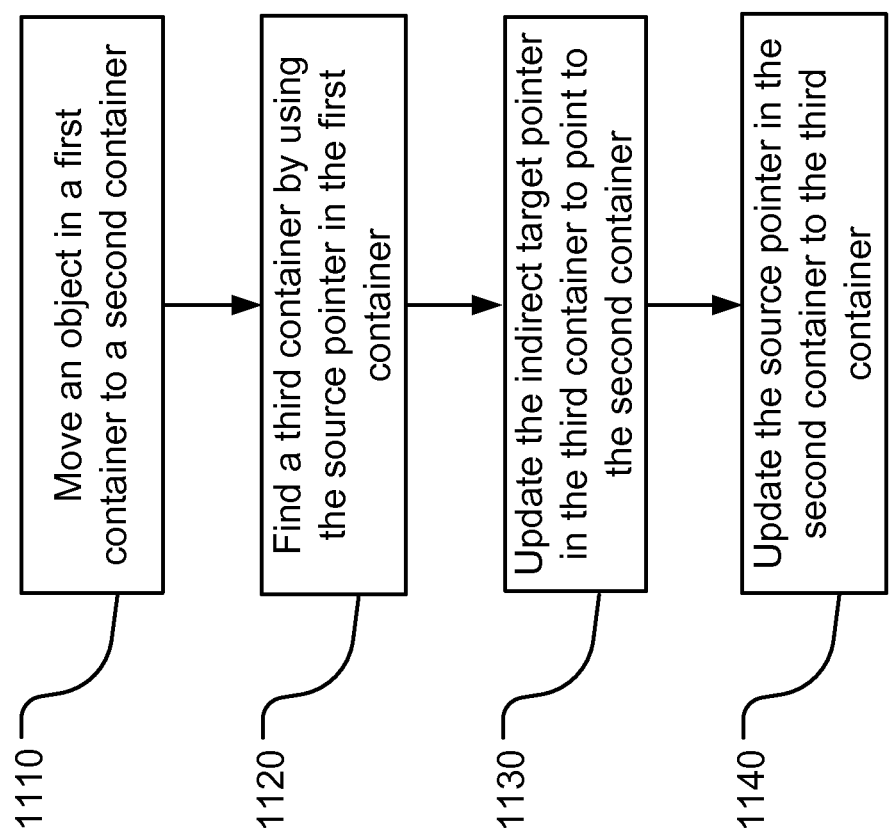
FIG. 11 is a flow chart for memory management using inode containers with indirect pointers.

FIG. 11 is a flow chart for memory management using inode containers with indirect pointers. At Step 1110, an object (e.g. inode 5, FIG. 9) stored in a first container (e.g. inode container 1, FIG. 9) is moved to a second container (e.g. inode container 0, FIG. 10). At Step 1120, a third container (e.g. inode container 5, FIG. 9) is found by using the indirect source pointer in the first container (e.g. inode container 1, FIG. 9). At Step 1130, the indirect target pointer in the third container (e.g. inode container 5, FIG. 10) is updated to point to the second container (e.g. inode container 0, FIG. 10). At Step 1140, the indirect source pointer in the second container (e.g. inode container 0, FIG. 10) is updated to the third container (e.g. inode container 5, FIG. 10). In alternative embodiments, Step 1110 can be executed between Steps 1130 and 1140, or after Step 1140.

Figure 12:
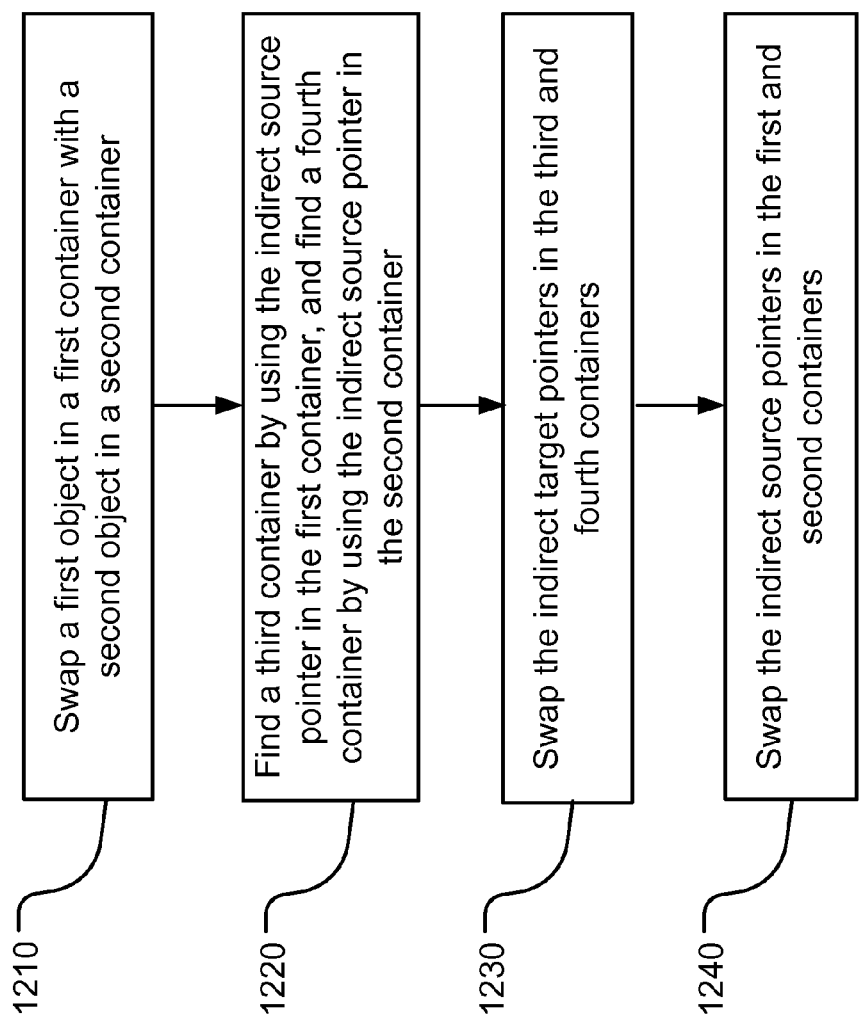
FIG. 12 is an alternative flow chart for memory management using inode containers with indirect pointers.

FIG. 12 is an alternative flow chart for memory management using inode containers with indirect pointers. At Step 1210, a first data object (e.g. inode 5) stored in a first container (e.g. inode container 1) is swapped with a second data object (e.g. inode 0) in a second container (e.g. inode container 0), as illustrated in FIGS. 9 and 10. At Step 1220, a third container (e.g. inode container 5) is found by using the indirect source pointer in the first container (e.g. inode container 1), and a fourth container (e.g. inode container 0) is found by using the indirect source pointer in the second container (e.g. inode container 0), as illustrated in FIG. 8. In this example, the second container and the fourth container both refer to inode container 0, because the indirect source pointer s in inode container 0 points back to inode container 0. In general, the second container and the fourth container can refer to different containers.

At Step 1230, the indirect target pointers (e.g. t=1 and t=0) in the third and fourth containers (e.g. inode containers 5 and 0) are swapped, as illustrated in FIGS. 8 and 9. The indirect target pointers can be swapped by updating the indirect target pointer t in the third container (e.g. inode container 5) to point to the container that is pointed to by the indirect target pointer t of the fourth container (e.g. inode container 0), and by updating the indirect target pointer t in the fourth container (e.g. inode container 0) to point to the container that was pointed to by the indirect target pointer t of the third container before the indirect target pointer t of the third container is updated (e.g. inode container 1).

At Step 1240, the indirect source pointers (e.g. s=0 and s=5) in the first and second containers (e.g. inode containers 0 and 1) are swapped, as illustrated in FIGS. 9-10. The indirect source pointers can be swapped by updating the indirect source pointer s in the second container (e.g. inode container 0) to point to the third container (e.g. inode container 5), and by updating the indirect source pointer s in the first container (e.g. inode container 0) to point to the fourth container (e.g. inode container 0), which is also referred to as the second container in this example.

In alternative embodiments, Step 1210 can be executed between Steps 1230 and 1240, or after Step 1240.

Figure 13:
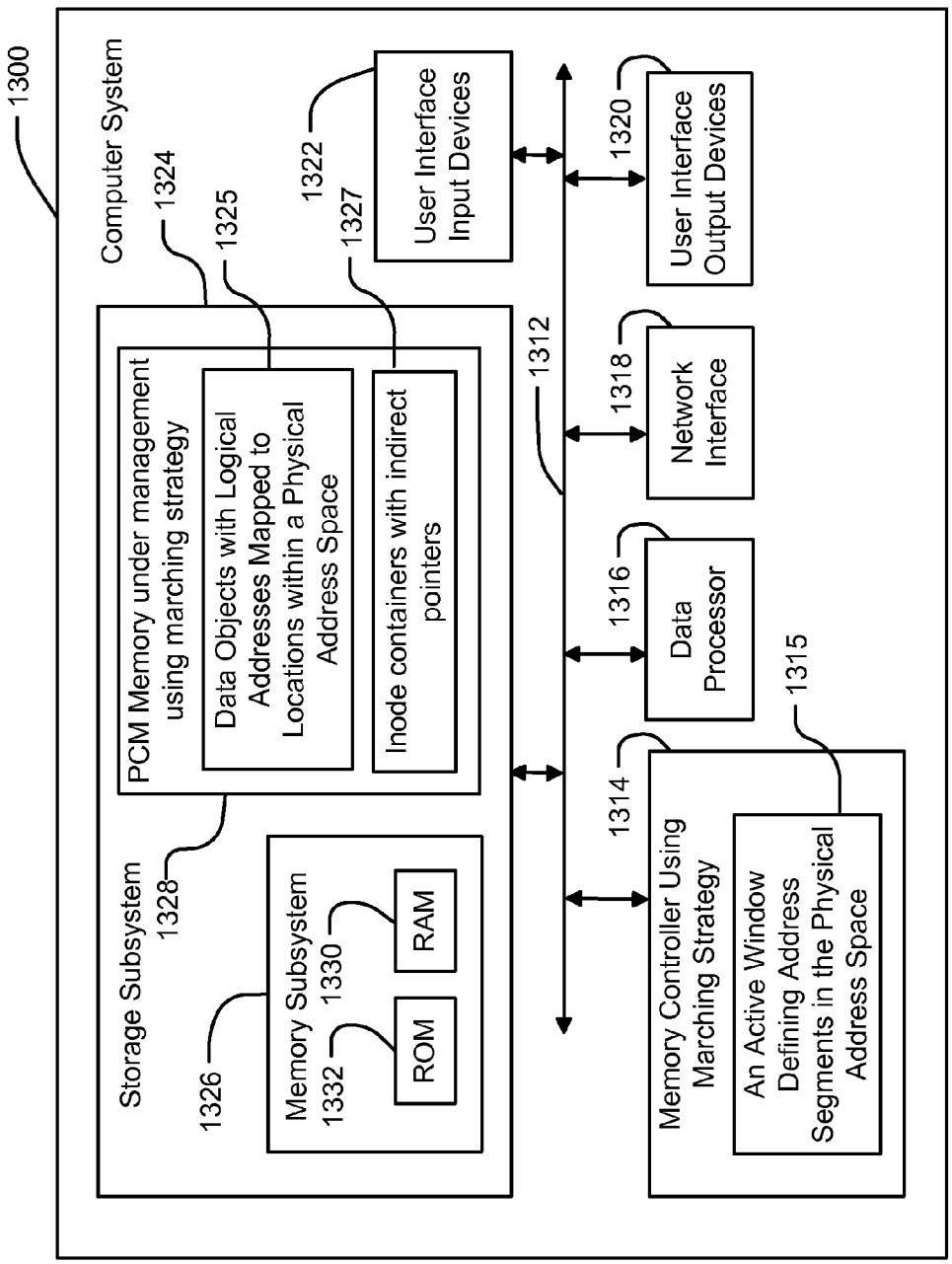
FIG. 13 is a block diagram of an example computer system.

FIG. 13 is a block diagram of an example computer system 1300, according to one implementation. Computer system 1300 can include a storage subsystem 1324 including a memory 1328 including a physical address space 1325, and a memory controller 1314 coupled to at least the memory 1328. The memory 1328 can be under memory management using the marching strategy as described herein. The memory 1328 can include data objects with logical addresses mapped to locations within the physical address space 1325 and store inode containers with indirect pointers 1327. The marching strategy can use the inode containers with indirect pointers.

The memory 1328 may include phase change memory materials, like chalcogenides, and other programmable resistance materials. Phase change memory materials may include alloys of materials such as germanium (Ge), antimony (Sb), tellurium (Te), gallium (Ga), indium (In), silver (Ag), selenium (Se), thallium (Ti), bismuth (Bi), tin (Sn), copper (Cu), palladium (Pd), lead (Pb), sulfur (S), and gold (Au). Phase change materials include $Ge_xSb_xTe_x$ materials in general. Other programmable resistance memory can be used as well, including metal oxide memory, flash memory, electrolytic conductive bridge memory, and so on.

The memory controller 1314 includes programs or other logic for managing utilization of a memory (e.g. 1328) including a physical address space (e.g. 1325), using the marching strategy as described herein. The memory controller 1314 can include internal memory (1315) storing an active window defining address segments in the physical address space (e.g. 1325), and information used in managing the active window such as the per-segment counts of accesses to address segments in the active window. The active window can also be stored in a main random access memory (RAM) 1330 for storage of instructions and data during program execution. Physical to logical mapping can be stored in the main random access memory (RAM) 1330 or internal memory of the memory controller 1314.

In particular, the memory controller 1314 includes logic to map logical addresses of data objects to locations within the physical address space; logic to define a plurality of address segments in the physical address space as an active window; logic to allow writes of data objects having logical addresses mapped to locations within the plurality of address segments in the active window; logic, upon detection of a request to write a data object having a logical address mapped to a location outside the active window, to update the mapping so that the logical address maps to a selected location within the active window, and then to allow the write to the selected location; logic to move the active window in the physical address space including maintaining access data indicating utilization of the plurality of address segments in the active window, and adding and removing address segments from the active window in response to the access data; and logic to swap data objects between two containers in a set of containers in a given address segment in response to the access data.

The memory controller 1314 includes programs or other logic to perform memory management for a file system including a plurality of data objects. In particular, the memory controller 1314 includes logic to store the data objects (e.g. inodes) in a plurality of containers that has addresses and includes addressable units of a memory, to map the objects (e.g. inodes) to addresses for corresponding containers in the plurality of containers, and to store indirect pointers (e.g. target pointers) in the containers, where the indirect pointer in a particular container points to the address of a container in the plurality of containers in which the corresponding object is stored. The memory controller 1314 includes logic to store source pointers in the containers, where the source pointer in the particular container points to the address of the container in the plurality of containers to which the object stored in the particular container is mapped. The memory controller 1314 includes logic to move an object stored in a first one of the containers to a second one of the containers, and to use the source pointer in the first one to find a third one to which the object is mapped. The memory controller 1314 includes logic to update the indirect pointer in the third one to point to the second one, and updating the source pointer in the second one to point to the third one.

The memory controller 1314 may include a metadata manager 125 including an endurance-aware management unit 126 (FIG. 1). The example computer system 1300 and/or the memory controller 1314 may include logic to perform other tasks as set forth in the description for the method for memory management for a file system including a plurality of data objects such as files, directories, inodes, etc.

The memory 1328 may be on an integrated circuit, where the memory controller 1314 includes logic on the integrated circuit. Computer system 1300 may include a data processor 1316, wherein the memory controller 1314 includes logic on the data processor 1316. For example, the logic may include algorithms such as Marching Algorithm described herein.

The data processor 1316 communicates with a number of peripheral devices via bus subsystem 1312. These peripheral devices may include the storage subsystem 1324 including, for example, memory devices such as ROM and RAM, and the memory 1328 with wear leveling, user interface input devices 1322, user interface output devices 1320, and a network interface subsystem 1318. The input and output devices allow user interaction with computer system 1300. Network interface subsystem 1318 provides an interface to outside networks.

User interface input devices 1322 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 1300 to the user or to another machine or computer system.

Storage subsystem 1324 stores programming and data constructs that provide the functionality of some or all of the modules and methods described herein. These software modules are generally executed by data processor 1316 alone or in combination with other processors.

Memory subsystem 1326 used in the storage subsystem 1324 can include a number of memories including a main random access memory (RAM) 1330 for storage of instructions and data during program execution and a read only memory (ROM) 1332 in which fixed instructions are stored. The storage subsystem 1324 can provide persistent storage for program and data files, and may include a hard disk drive, a floppy disk drive along with associated removable media, a CD-ROM drive, an optical drive, or removable media cartridges. The modules implementing the functionality of certain implementations may be stored in the storage subsystem 1324, or in other machines accessible by the processor.

Bus subsystem 1312 provides a mechanism for letting the various components and subsystems of computer system 1300 communicate with each other as intended. Although bus subsystem 1312 is shown schematically as a single bus, alternative implementations of the bus subsystem may use multiple busses.

Computer system 1300 can be of varying types including a workstation, server, computing cluster, blade server, server farm, or any other data processing system or computing device. Due to the ever-changing nature of computers and networks, the description of computer system 1300 depicted in FIG. 13 is intended only as one example. Many other configurations of computer system 1300 are possible having more or fewer components than the computer system depicted in FIG. 13.

The present technology is applicable to memories with lifetime limitations including (PCM) phase change memory, NAND flash, NOR flash, magnetic random access memory (RAM), and resistive random access memory (RAM). The present technology is applicable to file systems including the EXT2/EXT3 file systems. Although the present specification uses inodes as an example of data objects, the present technology is also applicable to data objects that contain other types of metadata. For instance, the present technology is applicable to the File Allocation Table (FAT) in the FAT file system, and the Master File Table (MFT) of the New Technology File System (NTFS).

The present technology can be implemented in computer hardware, software, or firmware that has access to data objects such as metadata of a file system. The computer hardware, software, or firmware can include MMU, CPU, and reuseable hardware design units including intellectual property (IP) cores.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for managing utilization of a memory including a physical address space, comprising:
    mapping logical addresses of data objects to locations within the physical address space, wherein a plurality of address segments in the physical address space forms an active window, and the physical address space includes address segments outside the active window different than those of the plurality of address segments within the active window;
    allowing writes of data objects having logical addresses mapped to locations within the plurality of address segments in the active window;
    upon detection of a request to write a data object having a logical address mapped to a location outside the active window, updating the mapping so that the logical address maps to a selected location within the active window;
    maintaining access data indicating utilization of the plurality of address segments in the active window; and
    adding and removing address segments from the active window in response to the access data;
    wherein the access data includes a second window count of accesses to the plurality of address segments in the active window, and a set of per-segment counts of accesses to corresponding address segments in the active window.

2. The method of claim 1, further comprising moving the active window in the physical address space.

3. The method of claim 1, wherein the access data includes a first window count of accesses to the plurality of address segments in the active window, including adding an address segment to the active window when the first window count reaches a first threshold for the window and the logical address of the data object is mapped to a selected location outside the active window.

4. The method of claim 3, wherein the step of maintaining access data includes incrementing the first window count upon detection of a request to write a data object, and resetting the first window count if the first window count reaches the first threshold for the window.

5. The method of claim 1, including, upon detection of a request to write a data object having a logical address mapped to a location inside the active window, removing an address segment including the location inside the active window from the active window when the second window count reaches a second threshold for the window and the per-segment count for the address segment reaches a per-segment threshold for the address segment.

6. The method of claim 5, wherein the plurality of address segments include respective sets of more than two containers for the data objects, including upon detection of a request to write a data object having a logical address mapped to a location inside the active window, swapping the data objects between two of the containers in the set of containers in a given address segment including the data object if the per-segment count of accesses to the given address segment is below the per-segment threshold and the second window count reaches the second threshold.

7. The method of claim 1, including upon said detection, moving a data object in the selected location to said location outside the active window and updating the mapping so that a logical address of the data object in the selected location is mapped to said location outside the active window, wherein the data object moved is one of the data objects having logical addresses mapped to locations within the plurality of address segments in the active window before said moving.

8. The method of claim 1, including identifying the selected location using a pointer, and incrementing the pointer to identify a next selected location to be used in case of another request to write to a location outside the active window.

9. The method of claim 1, wherein the mapping includes indirect pointers stored in the memory that includes the plurality of address segments.

10. An apparatus, comprising:
a memory including a physical address space; and
a memory controller coupled to the memory, including logic to map logical addresses of data objects to locations within the physical address space; logic to define a plurality of address segments in the physical address space as an active window, wherein the physical address space includes address segments outside the active window different than those of the plurality of address segments within the active window; logic to allow writes of data objects having logical addresses mapped to locations within the plurality of address segments in the active window; logic, upon detection of a request to write a data object having a logical address mapped to a location outside the active window, to update mapping so that the logical address maps to a selected location within the active window; logic to maintain access data indicating utilization of the plurality of address segments in the active window; and logic to add and to remove address segments from the active window in response to the access data,
wherein the access data includes a second window count of accesses to the plurality of address segments in the active window, and a set of per-segment counts of accesses to corresponding address segments in the active window.

11. The apparatus of claim 10, wherein the memory controller further including logic to move the active window in the physical address space.

12. The apparatus of claim 10, wherein the access data includes a first window count of accesses to the plurality of address segments in the active window, and the memory controller includes logic to add an address segment to the active window when the first window count reaches a first threshold for the window and the logical address of the data object is mapped to a selected location outside the active window.

13. The apparatus of claim 12, wherein the logic to maintain access data includes logic to increment the first window count upon detection of a request to write a data object, and logic to reset the first window count if the first window count reaches the first threshold for the window.

14. The apparatus of claim 10, wherein the memory controller includes logic, upon detection of a request to write a data object having a logical address mapped to a location inside the active window, to remove an address segment including the location inside the active window from the active window when the second window count reaches a second threshold for the window and the per-segment count for the address segment reaches a per-segment threshold for the address segment.

15. The apparatus of claim 14, wherein the plurality of address segments include respective sets of more than two containers for the data objects, and the memory controller includes logic, upon detection of a request to write a data object having a logical address mapped to a location inside the active window, to swap the data objects between two of the containers in the set of containers in a given address segment including the data object if the per-segment count of accesses to the given address segment is below the per-segment threshold and the second window count reaches the second threshold.

16. The apparatus of claim 10, wherein the memory controller includes logic, upon said detection, to move a data object in the selected location to said location outside the active window and to update the mapping so that a logical address of the data object in the selected location is mapped to said location outside the active window, wherein the data object moved is one of the data objects having logical addresses mapped to locations within the plurality of address segments in the active window before the data object is moved.

17. The apparatus of claim 10, wherein the memory controller includes logic to identify the selected location using a pointer, and logic to increment the pointer to identify a next selected location to be used in case of another request to write to a location outside the active window.

18. The apparatus of claim 10, wherein the mapping includes indirect pointers stored in the memory that includes the plurality of address segments.

* * * * *